G. T. GREER & R. A. FONTAINE.
LOADING AND UNLOADING ATTACHMENT FOR VEHICLES.
APPLICATION FILED JUNE 2, 1917.
1,252,899.
Patented Jan. 8, 1918.
3 SHEETS—SHEET 3.
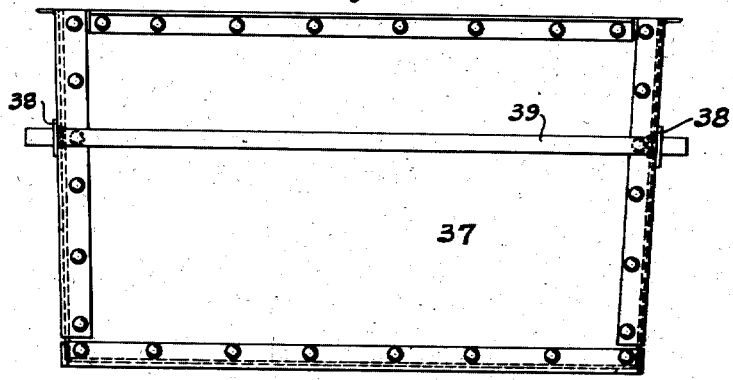
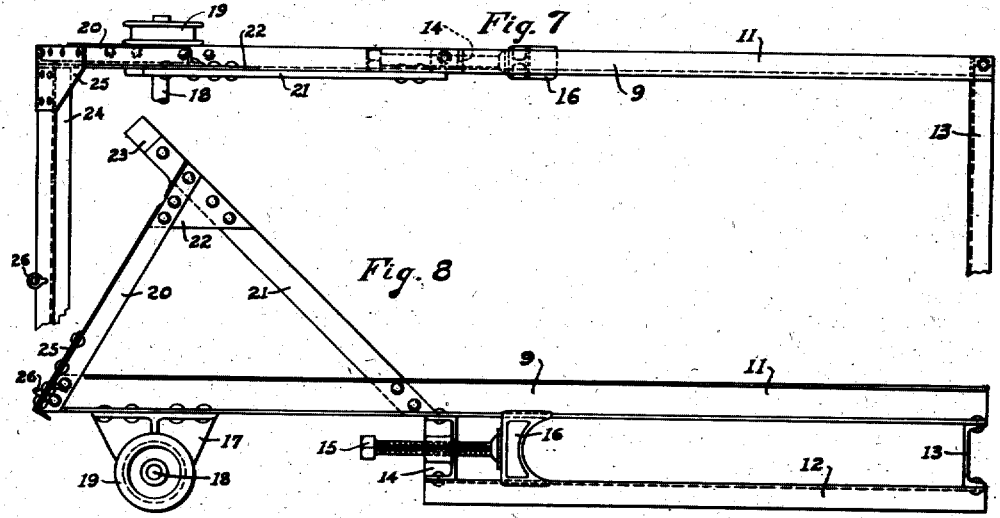
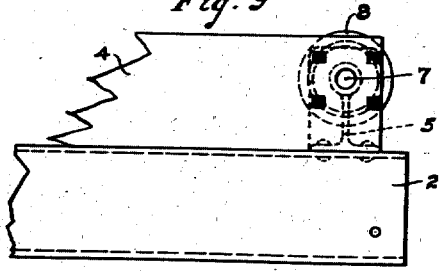
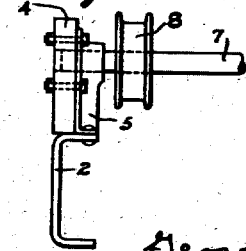
Witness
A. K. Simmons
Inventors
George T. Greer
and Robert A. Fontaine
By B. W. Kadel.
Attorney

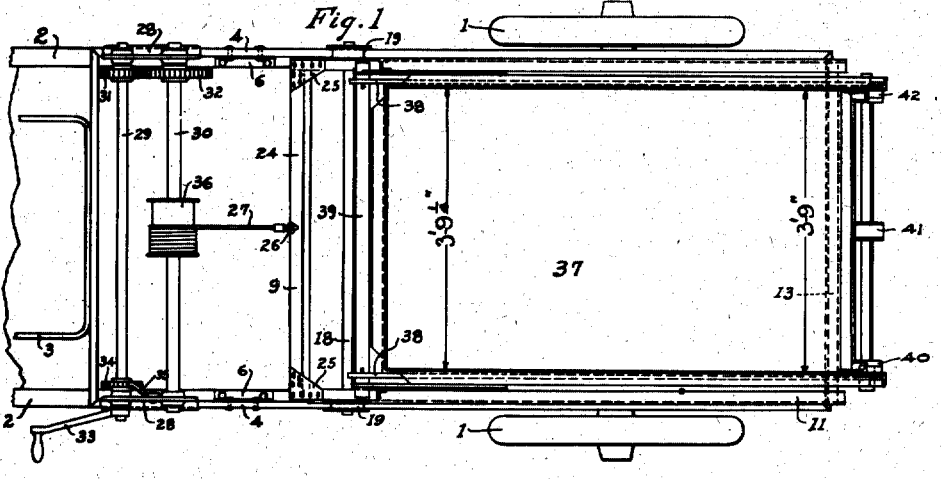

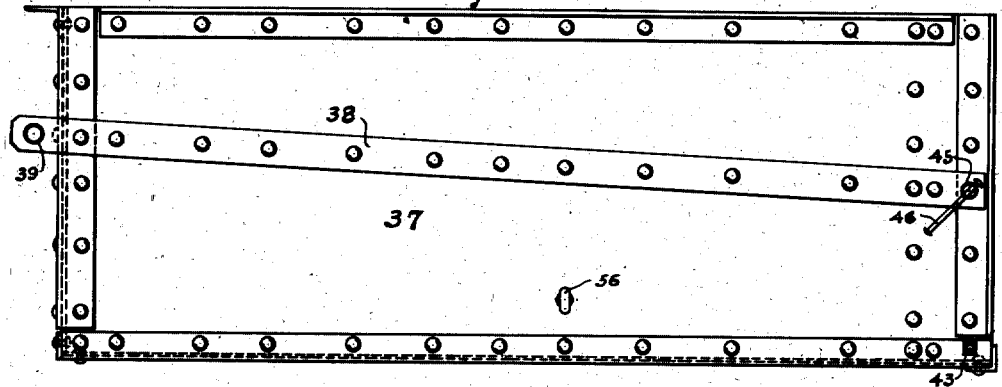
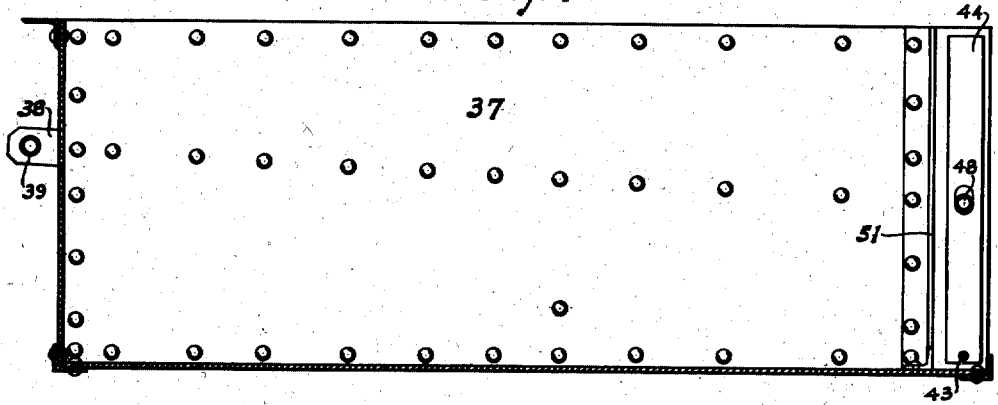
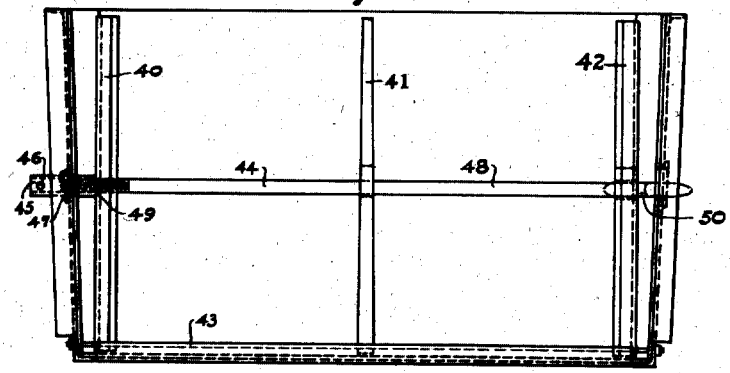

UNITED STATES PATENT OFFICE.

GEORGE T. GREER AND ROBERT A. FONTAINE, OF ROANOKE, VIRGINIA.

LOADING AND UNLOADING ATTACHMENT FOR VEHICLES.

1,252,899.      Specification of Letters Patent.      Patented Jan. 8, 1918.

Application filed June 2, 1917. Serial No. 172,554.

*To all whom it may concern:*

Be it known that we, GEORGE T. GREER and ROBERT A. FONTAINE, citizens of the United States, residing at Roanoke, in the county of Roanoke and State of Virginia, have invented certain new and useful Improvements in Loading and Unloading Attachments for Vehicles, of which the following is a specification.
The present invention relates to mechanisms for use with motor trucks or other vehicles whereby the lading may be readily loaded and unloaded and is particularly intended to handle articles such as brick or the like that may be readily stacked. The object of the invention is to provide improvements generally in devices of this character, and with such object in view the invention consists of the formation, combination and arrangement of parts as will be herein set forth and claimed.

In the drawings, Figure 1 is a plan view of the rear end of a motor truck equipped in accordance with the present invention and Fig. 2 a side elevational view of the same. Fig. 3 is a side elevational view of the body detached from the truck and Fig. 4 a central, longitudinal section of the same. Figs. 5 and 6 are rear and front elevational views respectively of the body. Fig. 7 is a broken plan view showing one side of the frame and Fig. 8 a side elevational view of the same. Fig. 9 is a broken side elevational view showing the rear end of the runway on the truck frame and Fig. 10 a broken end elevational view of the same, these figures showing the arrangement of the roller upon which the frame travels. Fig. 11 is a broken end elevational view of the body standing on its end upon the ground and with a portion of a load of bricks or the like therein.

Referring now to these drawings, the motor truck is shown as having wheels 1, side frames 2 and a cab 3. Mounted upon each of the motor frames is a runway rail 4, these being secured to the frames by means of the brackets 5 and 6. These runways are inclined for a portion of their lengths from the rear toward the front of the truck. The brackets 5 also constitute a bearing for the transversely disposed shaft 7, this shaft having secured to it a pair of sheaves or rollers 8, one being disposed just inside of each of the bearings 5 which are secured to the inner faces of the runways.

The body which receives the lading is de-
tachable from the truck and is carried in a frame or cradle 9. This cradle is designed when fully on the truck to occupy a plane substantially parallel with the incline 10 of the runways 4 and consists of a pair of parallel side channels 11 which aline with and travel upon the rollers 8. Mounted below each channel 11 and spaced therefrom a sufficient distance to accommodate the roller 8 is an angle bar 12. At the rear end of the frame a cross beam such as the channel 13 extends from one side to the other of the frame and with its ends disposed between and secured to the channels 11 and angle bars 12 and serving to space one of these latter from the other. At the front ends of the angles 12 brackets 14 are used to space the channels 11 and angle bars 12, these brackets being disposed between and being secured to the said channels and angles. The brackets 14 are each arranged also with a threaded opening to accommodate an adjusting screw 15 which extends parallel with and between the said channel and angle bar. Carried upon the rear end of the adjusting screws are stop blocks 16 which are arranged with upper and lower ways or grooves to embrace the adjacent edges of the channels 11 and angles 12 respectively. These stop blocks are adapted to contact the rollers 8 when the frame and body are allowed to move to the rear of the truck and to swing thereabout to deposit the body upon the ground.

The side channels 11 continue toward the front of the truck for some distance beyond the ends of the angle bars 12 and each one carries on its lower face and near its front end a bracket or bearing 17. These accommodate the transversely disposed axle 18 upon which are mounted the runway wheels or rollers 19. These rollers are spaced to line with and bear upon the inclined portion of the runway rails 4 and the front end of the lading is supported thereupon.

From the extreme front ends of the side channels 11 angles 20 extend upwardly and rearwardly and at their upper ends are joined to the braces 21 which extend downwardly and rearwardly to the channels 11. Gussets 22 join the angles 20 and braces 21 together and the braces 21 extend upwardly somewhat beyond the intersection of the two parts to form the projections 23. These projections serve with the angles 20 and gussets 22 to form engaging means for picking up the body as will later be explained, and the entire arms form means for lifting and holding the body and its lading.

Extending across the front end of the frame is a cross bar or channel 24, this being joined to the angles 20 by means of gussets 25. To this cross bar is secured, by means of the eyebolt 26 a rope or cable 27.

Mounted on the front ends of the runway rails 4 are brackets 28 and these accommodate the winding shaft 29 and drum shaft 30, the gears 31 and 32 being secured respectively on these shafts and gearing the same together. On one end of the winding shaft is a crank 33 and at a suitable point on one or the other of the shafts is the ratchet wheel 34 with its coöperating pawl 35 to hold the load in position. A drum 36 is mounted on the shaft 30 and upon this the cable 27 is wound to draw the frame to its forward position upon the truck.

The body 37 is in the present embodiment constructed of plates, angle-irons, and bars and as positioned upon the motor truck is made with its top and its rear end open and with all of its other sides closed. The bars 38 extend along each side of the body and beyond the front end thereof and are there pierced to accommodate the transversely disposed lifting bar 39. This bar extends laterally beyond the sides of the body a sufficient distance to be engaged by the lifting arms of the frame, the ends of the bar 39 seating in the elbows formed by the angles 20, bars 21 and gussets 22 of the frame.

At the rear end of the body are a plurality of clamps, designated 40, 41 and 42. These are made in the form of bars or the like and are threaded at their lower ends upon a transversely disposed rod or pintle 43 about which these clamp bars may swing to a limited extent. Disposed transversely of the body is a clamp-actuating mechanism 44 which is constructed as follows: The rear ends of each of the bars 38 and the contiguous sides of the body are pierced and through one side extends a short section of pipe 45. This pipe is provided at its outer end with a lever or handle 46 for rotating it and has also an abutment such as the pin 47 which bears against the outside of the body around the pierced opening therein. The pipe 45 is internally threaded to accommodate the threads on the end of a bar 48. This bar is threaded through co-alining openings in the clamping bars 40, 41 and 42 and through the far side of the body. The inner end of the pipe 45 bears at 49 against the near side of the bar 40 and the bar 48 is provided with shoulders at 50 to engage the sides of the opening at the far side of the clamping bar 42. Thus when the pipe 45 is rotated the clamping bar 42 is drawn toward the bar 40 and articles disposed therebetween will be firmly held in place. When the pipe 45 is unscrewed from the bar 48 the latter may be withdrawn from the clamping bars, the opening in the far side of the body being elongated to permit the passage of the shoulders 50. While the bar 48 is in place the clamping bars are held from rotation about the pintle 43, but when the same is withdrawn the clamping bars may swing so as to facilitate the withdrawal of the body from its contents. The intermediate clamping bar 41 serves to break the load up into sections and is made tapered so that it will readily leave the load. The body is also tapered, being larger toward the top than at the bottom inasmuch as the body is drawn away from its contents in a corresponding direction when the same is deposited open end downward upon the ground.

A description of the operation and use of the device will now be given, it being contemplated that two or more of the bodies will be used with each truck equipment.

First, a detached, empty body is placed upon a platform with its open downward and its open top to the rear, the clamps 40, 41 and 42 being is position upon the rod 48, a similar position of the body being shown in Fig. 11. A layer of articles to be hauled such as brick is placed in the lowermost part of the body between the clamping bars and these latter are then drawn together to clamp the bricks as already explained. Outstanding from the inner faces of the walls of the body near the bottom are the legs of the angle irons 51 and these are disposed at such a height that they form shelves to partly support the next layer of brick. Thus, as shown in Fig. 11 the brick are racked up within the body, the clamped bricks 52 serving to partly support the mass above and the angles 51 also serving largely to support it.

When the body is loaded a truck equipped with the apparatus already described is backed up to it with the frame retreated and standing in dropped position somewhat as indicated in dotted lines in Fig. 2. The center of gravity of the frame, however, is so located that the bottom thereof will tend to swing in toward the rear wheels of the truck about the axis of the rollers 8 as a center, so that the arms of the frame have swung into such a position that the projection 23 will pass under the ends of the rod 39. By now rotating the drum 36 the frame will be drawn up, the elbows engaging the ends of the bar 39 and raising the body and its load off the ground by swinging the entire mass about the rollers 8. The lower or rear end of the body rests upon the cross bar 13 of the frame. Continued winding will draw the entire mass up the incline of the runway rails, the rear end of the frame traveling on the rollers 8. When completely up the ratchet 35 is dropped into engagement with the ratchet wheel to hold the frame in traveling position.

Upon arrival at the point of unloading the ratchet is disengaged and the frame allowed to retreat down the runway and to swing down into the dotted line position of Fig. 2. Blocking 54 is placed under the open end of the body to contact the brick and the weight is left down upon them. When the clamps are loosed the weight of the frame and body will carry them on downward within the limits set by the adjusting screw 15, the bricks resting upon the blocks 54. Thus the weight of the bricks is removed from the angles 51 and the bricks are freed from the body which is made of slightly greater width at its front end than at the rear. This increased width need not be great and because of the reduced scale of Fig. 1 relative dimensions of 3′ 9″ and 3′ 9¼″ are given to indicate more clearly this construction. In Fig. 11 the taper is somewhat magnified to clearly show the desired construction. The hooks 55 on the frame of the car are then attached to the eyes 56 on the body and the motor run ahead, pulling the body free of the load of bricks and leaving them in an orderly stack. In the embodiment shown it is necessary that the rod 48 be removed to allow the passage of any bricks in its plane and to the front of it. Detaching the hooks 55, the frame and body may be raised again into traveling position and returned to the yards where the empty body may be exchanged for a loaded one.

Thus the entire time of the motor truck and driver will be utilized and articles handled with despatch.

The apparatus shown in the drawings and described at length herein is a practical embodiment of the invention. But it will be understood that other embodiments are possible within the scope of the appended claims without departing from the spirit of the invention.

What is claimed is:

1. In a loading and unloading device, a conveying vehicle, a load-carrying body having an open top and an open end, means for carrying the said body upon the vehicle, and means for applying the body thereto and removing it therefrom, the said body being adapted when removed from the vehicle to be deposited upon its open end, and means in connection therewith for causing the said body to shift relative to its contents when so deposited.

2. In a loading and unloading device, a conveying vehicle, a load-carrying body having an open top and an open end, means for carrying the said body upon the vehicle, and means for applying the body thereto and removing it therefrom, the said body being adapted when removed from the vehicle to be deposited upon its open end, and means actuated by the weight of the body for causing the said body to shift relative to its contents when so deposited.

3. In a loading and unloading device, a conveying vehicle, a load-carrying body having an open top and an open end, means for carrying the said body upon the vehicle, and means for applying the body thereto and removing it therefrom, the said body being adapted when removed from the vehicle to be deposited upon its open end, and means in connection therewith for causing the said body to shift relative to its contents in such manner as to free the contents from binding within the body.

4. In a loading and unloading device, a conveying vehicle, a load-carrying body having an open top and an open end, means for carrying the said body upon the vehicle with its open top upward, and means for applying the body thereto and removing it therefrom, the said body being adapted when removed from the vehicle to be deposited upon its open end, means for supporting the contents of the body at the lower end thereof while being deposited, said means including projecting supports on the inner faces of the body, and means for causing the said supports to shift away from the contents when the body is deposited.

5. In a loading and unloading device, a conveying vehicle, a load-carrying body having an open top and an open end, means for carrying the said body upon the vehicle, and means for applying the body thereto and removing it therefrom, the said body being adapted when removed from the vehicle to be deposited upon its open end, means in connection therewith for causing the body to shift vertically relative to its contents for releasing the same, and means actuated by the vehicle for drawing the body away from the contents.

6. In a loading and unloading attachment for vehicles, a load-carrying body, a supporting frame therefor adapted to travel in a substantially horizontal plane upon the vehicle and to swing about a transverse axis into a substantially vertical plane at the rear end of the vehicle, there being portions of the frame adapted to support the body when in horizontal position and there being outstanding arms carried by the frame and projections upon the body adapted to engage the arms, whereby the body may be supported from the said frame when in the said vertical position.

7. In a loading and unloading attachment for vehicles, a load-carrying body, a supporting frame therefor adapted to travel in a substantially horizontal plane upon the vehicle and to swing about a transverse axis into a substantially vertical plane at the rear end of the vehicle, there being portions of the frame adapted to support the body when in horizontal position and there being outstanding arms carried by the frame and projections upon the body adapted to engage the arms, whereby the body may be supported from the said frame when in the said vertical position, and means attached to the frame for drawing the frame and body upon the vehicle.

8. In a loading and unloading attachment for vehicles, a load-carrying body, a supporting frame therefor adapted to travel by gravity in a substantially horizontal plane upon the vehicle toward the rear end thereof, and to swing by gravity about a transverse axis into a substantially vertical plane at the rear end of the vehicle, there being portions of the frame adapted to support the body when in horizontal position and there being outstanding arms carried by the frame and projections upon the body adapted to engage the arms, whereby the body may be supported from the said frame when in the said vertical position, and means attached to the frame for returning the frame and body to their normal positions upon the truck.

9. In a loading and unloading device for vehicles, a load-carrying body, a frame for receiving the same, means for causing the frame to recede by gravity toward the rear of the vehicle and for causing the frame to swivel about a transverse axis into a vertical position at the rear of the truck, and means operable for drawing the said frame away from the body or for drawing the said body therewith away from its contents, as desired, when in such vertical position.

10. In a loading and unloading device for vehicles, a load-carrying body, a frame for receiving the same, means for causing the frame to recede by gravity toward the rear of the vehicle, and for causing the frame to swivel by gravity about a transverse axis into a vertical position at the rear of the truck, and means for drawing the said body away from its contents when in such vertical position, there being also means for causing the contents of the body to shift relative thereto to release the same.

In testimony whereof we affix our signatures.

GEORGE T. GREER.
ROBERT A. FONTAINE.